J. N. McGRIFF.
CRANK.
APPLICATION FILED FEB. 9, 1910.
991,340.
Patented May 2, 1911.
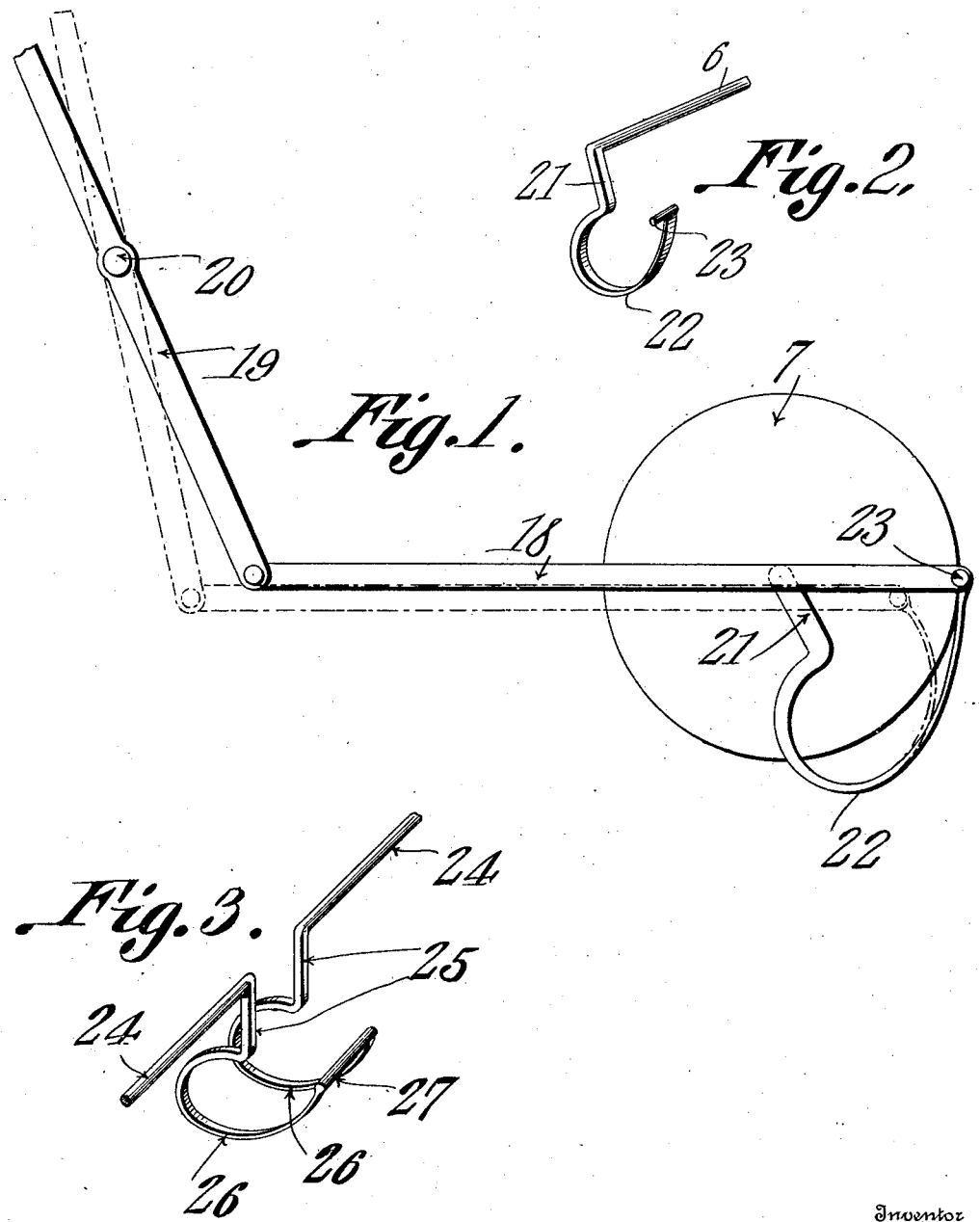
Witnesses
Inventor
John N. McGriff.
By C. A. Snow & Co.
Attorneys

UNITED STATES PATENT OFFICE.

JOHN N. McGRIFF, OF ANDERSON, INDIANA.

CRANK.

991,340. Specification of Letters Patent. Patented May 2, 1911.

Application filed February 9, 1910. Serial No. 542,956.

*To all whom it may concern:*

Be it known that I, JOHN N. McGRIFF, a citizen of the United States, residing at Anderson, in the county of Madison and State of Indiana, have invented a new and useful Crank, of which the following is a specification.

It is the object of this invention to provide a crank of novel and improved construction, so constituted that it may readily be moved from a dead center.

In the drawings,—Figure 1 is a side elevation, diagrammatic in nature, showing the application of the invention; Fig. 2 is a detail perspective view of the form of crank shown in Fig. 1; and Fig. 3 is a detail perspective view showing a modified form of crank.

The crank is a one piece structure comprising a shaft 6 having a straight, rectangularly disposed, rigid portion 21, terminating in a curved spring arm 22, the arm being tapered from its point of union with the rigid portion 21 to its free end. The curved spring arm 22 is located in a common plane with the rigid portion 21, and is located partly to one side of the rigid portion, and partly to the other side thereof, the spring arm 22 terminating at its free end, in a laterally projecting finger 23, adapted, as shown in Fig. 1, to receive a pitman 18, pivoted to the lower end of a lever 19, fulcrumed at 20.

In Fig. 3 of the drawing, a modified form of the invention is shown. The shaft 24 consists of two parts, the extremities of which are bent to form straight rigid portions 25, with which are united the curved spring portions 26, the said curved spring portions being connected at their ends, by a straight cylindrical bar 27, corresponding to the finger 23 of Fig. 2, it being noted that the construction, shown in Fig. 3, involves merely a duplication of the structure shown in Fig. 2.

Referring particularly to Fig. 1, it will be noted that, in operation, the spring portion 22 of the crank will yield, when the crank is on dead center, said spring portion 22 assuming the dotted line position shown in said figure, whereupon the finger 23 will be lowered below dead center, permitting a rotation of the fly wheel 7 or the like, which is mounted upon the shaft 6.

What is claimed is:

A device of the class described, comprising, in a one piece structure, a shaft having a straight, rectangularly-disposed, rigid portion terminating in a curved spring arm, the arm being tapered from its point of union with the rigid portion to its free end, the arm being located in a common plane with the rigid portion and being located partly to one side of the rigid portion and partly to the other side thereof, the arm terminating at its free end, in a laterally projecting finger, for the reception of a pitman.

In testimony that I claim the foregoing as my own, I have hereto affixed my signature in the presence of two witnesses.

JOHN N. McGRIFF.

Witnesses:
J. O. PLESSINGER,
CHARLES STITT.

---

Copies of this patent may be obtained for five cents each, by addressing the "Commissioner of Patents, Washington, D. C."